United States Patent
Inden et al.

(10) Patent No.: US 11,702,132 B2
(45) Date of Patent: Jul. 18, 2023

(54) STEERING CONTROL DEVICE

(71) Applicants: JTEKT CORPORATION, Kariya (JP); TOYOTA JIDOSHA KABUSHIKI KAISHA, Toyota (JP)

(72) Inventors: Yuki Inden, Okazaki (JP); Isao Namikawa, Okazaki (JP); Yuki Suehiro, Susono (JP); Yoshio Kudo, Machida (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/707,175

(22) Filed: Mar. 29, 2022

(65) Prior Publication Data
US 2022/0315102 A1 Oct. 6, 2022

(30) Foreign Application Priority Data
Mar. 30, 2021 (JP) .................................. 2021-058726

(51) Int. Cl.
*B62D 6/00* (2006.01)
*B62D 5/04* (2006.01)

(52) U.S. Cl.
CPC ........... *B62D 6/001* (2013.01); *B62D 5/0481* (2013.01)

(58) Field of Classification Search
CPC .............................. B62D 6/001; B62D 5/0481
See application file for complete search history.

(56) References Cited

U.S. PATENT DOCUMENTS

2020/0283059 A1 9/2020 Kodera et al.

FOREIGN PATENT DOCUMENTS

| EP | 3782876 A1 | 2/2021 |
| JP | 2003-002223 A | 1/2003 |
| JP | 2020-142596 A | 9/2020 |

OTHER PUBLICATIONS

Sep. 9, 2022 Search Report issued in European Patent Application No. 22164645.8.

*Primary Examiner* — Mathew Franklin Gordon
(74) *Attorney, Agent, or Firm* — Oliff PLC

(57) ABSTRACT

A steering control device includes a torque command value calculating unit configured to calculate a torque command value which is a target value of a motor torque when operation of a motor is controlled such that the motor torque is generated. The torque command value calculating unit includes a first component calculating unit configured to calculate a first component, a second component calculating unit configured to calculate a second component, and a torque component calculating unit configured to calculate a torque component. The first component calculating unit is configured to add a calculational hysteresis component to the first component such that hysteresis characteristics with respect to change of a specific state variable are provided. The torque component calculating unit is configured to perform calculation in a first calculation situation and calculation in a second calculation situation.

5 Claims, 6 Drawing Sheets

STEERING CONTROL DEVICE

CROSS-REFERENCE TO RELATED APPLICATION

This application claims priority to Japanese Patent Application No. 2021-058726 filed on Mar. 30, 2021, incorporated herein by reference in its entirety.

BACKGROUND

1. Technical Field

The disclosure relates to a steering control device.

2. Description of Related Art

In the related art, a steer-by-wire steering system in which a power transmission path between a steering unit that is steered by a driver and a turning unit that turns turning wheels according to a driver's steering is cut off is known as a type of steering system. In such a type of steering system, road surface information such as a road-surface reaction force applied to the turning wheels is not mechanically transmitted to a steering wheel. Therefore, a steering control device that controls such a type of steering system performs control such that road surface information is transmitted to a driver by controlling a steering-side actuator provided in the steering unit such that a steering reaction force is applied to the steering wheel in consideration of the road surface information.

For example, a steering control device described in Japanese Unexamined Patent Application Publication No. 2020-142596 (JP 2020-142596 A) determines a steering reaction force in consideration of axial forces acting on a turning shaft provided in a turning unit and uses a distributed axial force in which a plurality of types of axial forces is summed at predetermined distribution proportions considered as one axial force. In JP 2020-142596 A, an angle axial force based on a target turning angle for controlling a turning angle of turning wheels which is calculated based on a steering angle of a steering wheel, a current axial force based on a drive current of a turning-side motor which is a drive source of a turning-side actuator, and the like are exemplified as the plurality of types of axial forces. The steering control device described in JP 2020-142596 A calculates a steering reaction force based on the distributed axial force in which the angle axial force and the current axial force are distributed.

SUMMARY

A relationship between the steering angle serving as a basis of the target turning angle and an axial force actually acting on the turning shaft changes according to a vehicle speed. When a vehicle is in a stopped state, an axial force gradient which is a rate of change of the axial force with respect to the steering angle decreases and a hysteresis width of the axial force with respect to a change of the steering angle increases. On the other hand, when the vehicle is traveling at a middle or high speed, the axial force gradient increases and the hysteresis width decreases. The angle axial force may be calculated by adding a calculational hysteresis component such that a hysteresis width in which an actual hysteresis status of the axial force with respect to change of the steering angle is reflected is achieved.

When road conditions such as a road-surface reaction force are more accurately transmitted to a driver, for example, adjustment for increasing the axial force gradient of the distributed axial force is conceivable. This is effective when the distribution proportion of the current axial force is large. On the other hand, when the distribution proportion of the angle axial force is large and adjustment for increasing the axial force gradient of the distributed axial force is performed, a gradient of the added calculational hysteresis component becomes larger than assumed and thus there is a likelihood that vibration characteristics in control will appear.

This problem is not limited to the angle axial force calculated as a component of a steering reaction force, and can be caused similarly as long as there is a component of the steering reaction force calculated by adding the calculational hysteresis component such that a hysteresis width for reflecting an actual hysteresis status is achieved.

An aspect of the disclosure provides a steering control device. The steering control device controls a steering system in which a steering torque required for steering a steering wheel is changed using a motor torque applied from an actuator with a motor as a drive source. The steering control device includes a torque command value calculating unit configured to calculate a torque command value which is a target value of the motor torque when operation of the motor is controlled such that the motor torque is generated. The torque command value calculating unit includes a first component calculating unit configured to calculate a first component based on a first state variable changing according to an operation of the steering system, a second component calculating unit configured to calculate a second component based on a second state variable changing with the operation of the steering system, and a torque component calculating unit configured to calculate a torque component used to calculate the torque command value based on at least one of the first component and the second component. The torque command value calculating unit is configured to set the first state variable to a state variable not having hysteresis characteristics with respect to change of a specific state variable changing according to the operation of the steering system and to set the second state variable to a state variable having hysteresis characteristics with respect to change of the specific state variable. The first component calculating unit is configured to add a calculational hysteresis component to the first component such that hysteresis characteristics with respect to change of the specific state variable are provided when the first component is calculated. The torque component calculating unit is configured to perform calculation in a first calculation situation and calculation in a second calculation situation. The first calculation situation is calculation for adjusting a gradient of the second component with respect to change of the specific state variable, the second component being acquired by the second component calculating unit, the adjusted second component being used to calculate the torque component. The second calculation situation is calculation for adjusting a gradient of the torque component with respect to change of the specific state variable, the torque component being acquired by calculation based on at least one of the first component and the second component, the adjusted torque component being calculated as the final torque component.

With this configuration, the final torque component can be calculated separately using the first calculation situation and the second calculation situation according to situations. For example, in a situation in which a hysteresis gradient of the calculational hysteresis component added to the first component is assumed to be greater than expected when the second calculation situation is used, it is possible to curb vibration characteristics in control due to an increase of the hysteresis gradient associated with the first component more than expected while increasing the gradient of the second component with respect to change of the specific state variable using the first calculation situation. Accordingly, it is possible to achieve improvement in control stability.

In the steering control device, the first component calculating unit may be an angle axial force calculating unit configured to calculate an angle axial force, which is determined according to an angle which is able to be converted to a turning angle of turning wheels of a vehicle and which is an axial force in which road surface information is not reflected, as the first component. The second component calculating unit may be a current axial force calculating unit configured to calculate a current axial force, which is determined according to a current supplied to the motor and which is an axial force in which road surface information is reflected, as the second component.

In the steering control device, the torque component calculating unit may be configured to reflect the torque component acquired through calculation in the first calculation situation in the torque command value when the vehicle has a first vehicle speed including a stopped state. The torque component calculating unit may be configured to reflect the torque component acquired through calculation in the second calculation situation in the torque command value when the vehicle has a second vehicle speed including a traveling state.

With this configuration, in a stopped state, it is possible to curb vibration characteristics in control due to an increase of the hysteresis gradient associated with the first component more than expected while increasing the gradient of the second component with respect to change of the specific state variable using the first calculation situation. From a point of view of transmitting road surface conditions such as a road-surface reaction force to a driver, it is more preferable to increase the gradient of the torque component with respect to change of the specific state variable in the stopped state out of the stopped state and the traveling state. That is, a situation in which the hysteresis gradient of the calculational hysteresis component added to the first component is supposed to be greater than expected corresponds to the stopped state out of the stopped state and the traveling state. Accordingly, it is possible to achieve improvement in control stability by realizing a preferable mode from a point of view of transmitting road surface conditions such as a road-surface reaction force to a driver.

In the steering control device, the torque component calculating unit may include a mediation unit configured to mediate which of the torque components acquired through calculation in the first calculation situation and calculation in the second calculation situation is to be reflected in the torque command value while performing calculation in the first calculation situation and calculation in the second calculation situation in parallel. The mediation unit may be configured to reflect the torque component acquired through calculation in the first calculation situation in the torque command value when the vehicle has a first vehicle speed including a stopped state. The mediation unit may be configured to reflect the torque component acquired through calculation in the second calculation situation in the torque command value when the vehicle has a second vehicle speed including a traveling state.

With this configuration, it is possible to reflect the torque component acquired through calculation in the first calculation situation and the torque component acquired through calculation in the second calculation situation in the torque command value in consideration of a situation as recent as possible. Accordingly, it is possible to more accurately determine a situation in which improvement in control stability is to be achieved.

In the steering control device, the mediation unit may be configured to compensate for the torque component such that sudden change of the torque component between before and after switching is curbed when a component to be reflected in the torque command value is switched between the torque component acquired through calculation in the first calculation situation and the torque component acquired through calculation in the second calculation situation.

With this configuration, when a component to be reflected in the torque command value is switched between the torque component acquired through calculation in the first calculation situation and the torque component acquired through calculation in the second calculation situation, it is possible to curb sudden change of the torque component between before and after the switching. This is effective for achieving improvement in control stability.

With the steering control device according to the disclosure, it is possible to achieve improvement in control stability.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
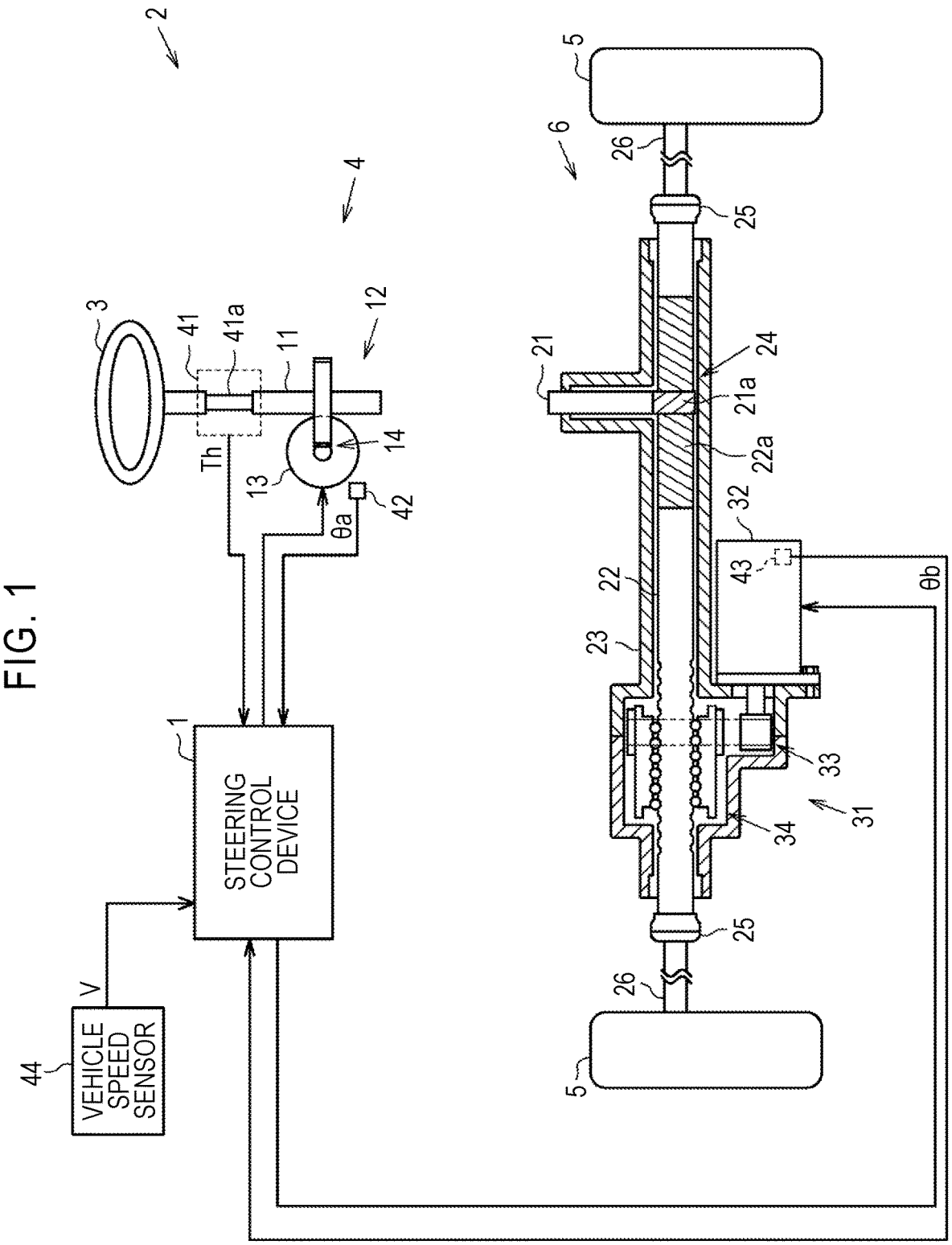
FIG. 1 is a diagram schematically illustrating a configuration of a steer-by-wire steering system.

A steering control device according to an embodiment will be described below with reference to the accompanying drawings. As illustrated in FIG. 1, a steering system 2 of a vehicle which is controlled by a steering control device 1 is configured as a steer-by-wire steering system. The steering system 2 includes a steering unit 4 that is steered by a driver using a steering wheel 3 and a turning unit 6 that turns turning wheels 5 according to steering which a driver inputs to the steering unit 4.

The steering unit 4 includes a steering shaft 11 and a steering actuator 12. The steering shaft 11 is connected to the steering wheel 3. The steering actuator 12 includes a steering-side motor 13 that serves as a drive source and a steering-side reduction gear mechanism 14. The steering-side motor 13 applies a steering reaction force which is a force against steering to the steering wheel 3 via the steering shaft 11. The steering-side motor 13 is connected to the steering shaft 11, for example, via the steering-side reduction gear mechanism 14 configured as a worm and wheel. For example, a three-phase brushless motor is employed as the steering-side motor 13 according to this embodiment.

The turning unit 6 includes a pinion shaft 21, a rack shaft 22 that is a turning shaft connected to the pinion shaft 21, and a rack housing 23. The pinion shaft 21 and the rack shaft 22 are connected to each other with a predetermined crossing angle. A rack and pinion mechanism 24 is configured by causing pinion teeth 21a formed in the pinion shaft 21 and rack teeth 22a formed in the rack shaft 22 to engage with each other. The rack and pinion mechanism 24 is accommodated in the rack housing 23. An end opposite to an end of the pinion shaft 21 connected to the rack shaft 22 protrudes from the rack housing 23. Both ends of the rack shaft 22 protrude from both ends in the axial direction of the rack housing 23. Tie rods 26 are connected to both ends of the rack shaft 22 via a rack end 25 formed of a ball joint. The tips of the tie rods 26 are connected to knuckles (not illustrated) to which the right and left turning wheels 5 are assembled.

The turning unit 6 includes a turning-side actuator 31 that applies a turning force for turning the turning wheels 5 to the rack shaft 22. The turning-side actuator 31 includes a turning-side motor 32 which is a drive source, a transmission mechanism 33, and a conversion mechanism 34. The turning-side motor 32 applies a turning force for turning the turning wheels 5 to the rack shaft 22 via the transmission mechanism 33 and the conversion mechanism 34. The turning-side motor 32 transmits rotation to the conversion mechanism 34 via the transmission mechanism 33 that is configured as, for example, a belt transmission mechanism. The transmission mechanism 33 converts rotation of the turning-side motor 32 to reciprocation of the rack shaft 22 via the conversion mechanism 34 that is configured as, for example, a ball screw mechanism.

In the steering system 2 having the aforementioned configuration, a turning angle of the turning wheels 5 is changed by applying a motor torque as the turning force from the turning-side actuator 31 to the rack shaft 22 according to a driver's steering operation. At this time, a steering reaction force against the driver's steering is applied to the steering wheel 3 from the steering actuator 12. That is, in the steering system 2, a steering torque Th required for steering the steering wheel 3 is changed by the steering reaction force which is a motor torque applied from the steering actuator 12.

The reason the pinion shaft 21 is provided is that the rack shaft 22 along with the pinion shaft 21 is supported in the rack housing 23. That is, by a support mechanism (not illustrated) which is provided in the steering system 2, the rack shaft 22 is supported to be movable in the axial direction thereof and is pressed toward the pinion shaft 21. Accordingly, the rack shaft 22 is supported in the rack housing 23. Another support mechanism that supports the rack shaft 22 in the rack housing 23 may be provided instead of using the first pinion shaft 21.

Electrical Configuration of Steering System 2

As illustrated in FIG. 1, the steering-side motor 13 and the turning-side motor 32 are connected to a steering control device 1. The steering control device 1 controls operations of the steering-side motor 13 and the turning-side motor 32.

A torque sensor 41, a steering-side rotation angle sensor 42, a turning-side rotation angle sensor 43, and a vehicle speed sensor 44 are connected to the steering control device 1. The torque sensor 41 detects a steering torque Th which is a value indicating a torque applied to the steering shaft 11 according to a driver's steering operation. The torque sensor 41 is provided in a part of the steering shaft 11 closer to the steering wheel 3 than the steering-side reduction gear mechanism 14. The torque sensor 41 detects the steering torque Th based on an amount of torsion of a torsion bar 41a provided in the middle of the steering shaft 11. For example, the steering torque Th is calculated as a positive value when steering to the right is performed and is calculated as a negative value when steering to the left is performed.

The steering-side rotation angle sensor 42 detects a rotation angle $\theta a$ which is an angle of a rotation shaft of the steering-side motor 13 as a relative angle in a range of 360°. The steering-side rotation angle sensor 42 is provided in the steering-side motor 13. The rotation angle $\theta a$ of the steering-side motor 13 is used to calculate a steering angle $\theta s$. The steering-side motor 13 and the steering shaft 11 interlock with each other via the steering-side reduction gear mechanism 14. Accordingly, the rotation angle $\theta a$ of the steering-side motor 13 and a rotation angle of the steering shaft 11 or the steering angle $\theta s$ which is a rotation angle of the steering wheel 3 have a correlation. Accordingly, the steering angle $\theta s$ can be calculated based on the rotation angle $\theta a$ of the steering-side motor 13. For example, the rotation angle $\theta a$ is detected as a positive value when steering to the right is performed and is detected as a negative value when steering to the left is performed.

The turning-side rotation angle sensor 43 detects a rotation angle $\theta b$ which is an angle of a rotation shaft of the turning-side motor 32 as a relative angle in a range of 360°. The turning-side rotation angle sensor 43 is provided in the turning-side motor 32. The rotation angle $\theta b$ of the turning-side motor 32 is used to calculate a pinion angle $\theta p$. The turning-side motor 32 and the pinion shaft 21 interlock with each other via the transmission mechanism 33, the conversion mechanism 34, and the rack and pinion mechanism 24. Accordingly, the rotation angle $\theta b$ of the turning-side motor 32 and the pinion angle $\theta p$ which is a rotation angle of the pinion shaft 21 have a correlation. Accordingly, the pinion angle $\theta p$ can be calculated based on the rotation angle $\theta b$ of the turning-side motor 32. The pinion shaft 21 engages with the rack shaft 22. Accordingly, the pinion angle $\theta p$ and an amount of movement of the rack shaft 22 also have a correlation. That is, the pinion angle $\theta p$ is a value in which the turning angle of the turning wheels 5 is reflected. For example, the rotation angle $\theta b$ is detected as a positive value when steering to the right is performed and is detected as a negative value when steering to the left is performed.

Function of Steering Control Device

The vehicle speed sensor 44 detects a vehicle speed V which is set as information indicating a travel speed of the vehicle. The steering control device 1 includes a central processing unit (CPU) and a memory which are not illustrated. The steering control device 1 performs various types of control by causing the CPU to execute a program stored in the memory at intervals of a predetermined calculation cycle.

Figure 2:
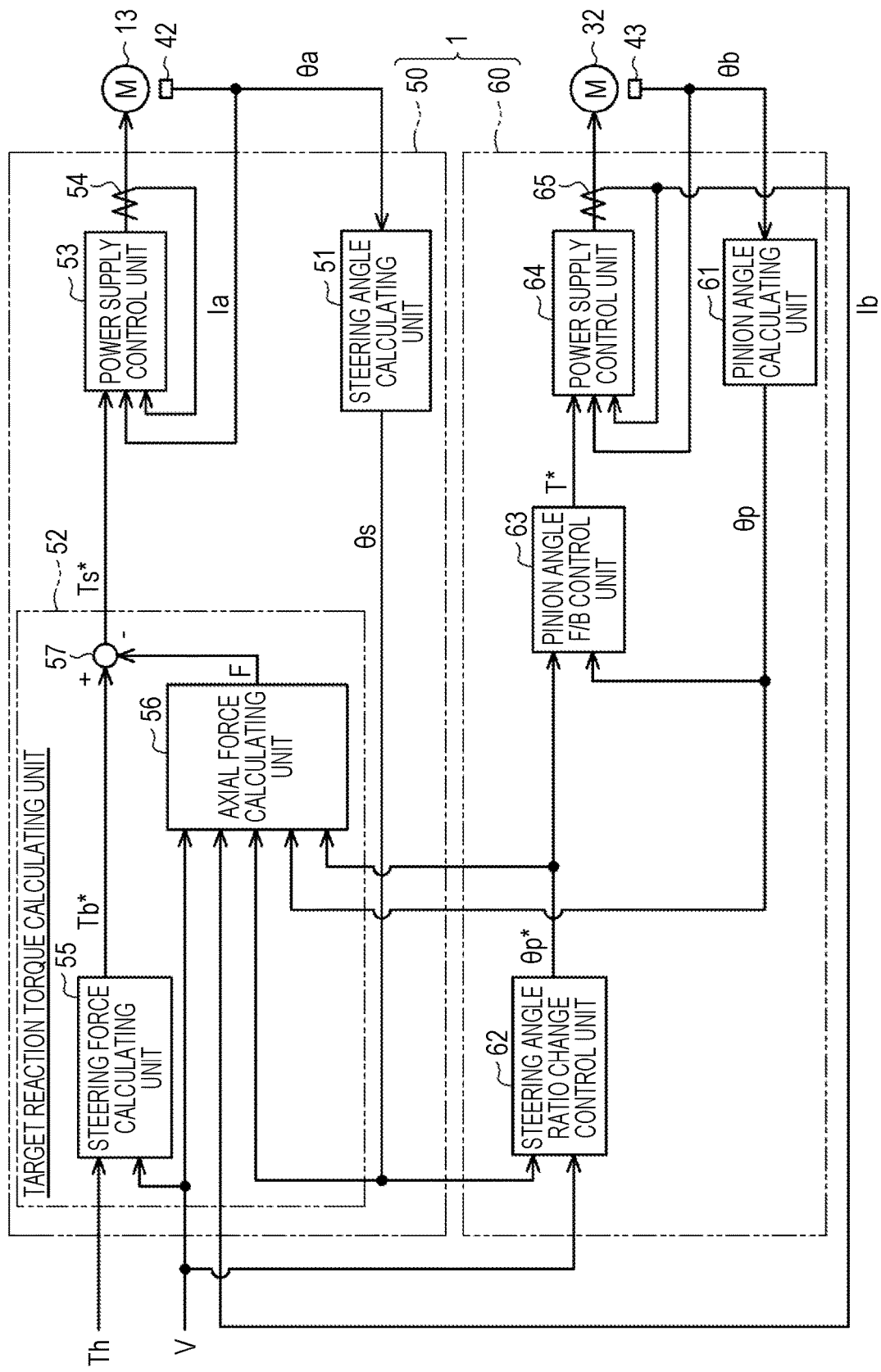
FIG. 2 is a block diagram illustrating functions of a steering control device.

As illustrated in FIG. 2, the steering control device 1 includes a steering-side control unit 50 that controls supply of electric power to the steering-side motor 13. The steering-side control unit 50 includes a steering-side current sensor 54. The steering-side current sensor 54 detects a steering-side actual current value Ia which is acquired from phase current values of the steering-side motor 13 flowing in a connection line between the steering-side control unit 50 and phase motor coils of the steering-side motor 13. The steering-side current sensor 54 acquires a voltage drop of a shunt resistor connected on the source side of each switching element in an inverter (not illustrated) provided to correspond to the steering-side motor 13 as a current. In FIG. 2, for the purpose of convenience of description, one of each of the phase connection lines and the phase current sensors is collectively illustrated.

The steering control device 1 includes a turning-side control unit 60 that controls supply of electric power to the turning-side motor 32. The turning-side control unit 60 includes a turning-side current sensor 65. The turning-side current sensor 65 detects a turning-side actual current value Ib which is acquired from phase current values of the turning-side motor 32 flowing in a connection line between the turning-side control unit 60 and phase motor coils of the turning-side motor 32. The turning-side current sensor 65 acquires a voltage drop of a shunt resistor connected to the source side of each switching element in an inverter (not illustrated) provided to correspond to the turning-side motor 32 as a current. In FIG. 2, for the purpose of convenience of description, one of each of the phase connection lines and the phase current sensors is collectively illustrated.

Steering-Side Control Unit

The steering torque Th, the vehicle speed V, the rotation angle θa, the turning-side actual current value Ib, the pinion angle θp, and a target pinion angle θp* which will be described later are input to the steering-side control unit 50. The steering-side control unit 50 controls supply of electric power to the steering-side motor 13 based on the steering torque Th, the vehicle speed V, the rotation angle θa, the turning-side actual current value Ib, the pinion angle θp and the target pinion angle θp*.

The steering-side control unit 50 includes a steering angle calculating unit 51, a target reaction torque calculating unit 52, and a power supply control unit 53. The rotation angle θa is input to the steering angle calculating unit 51. The steering angle calculating unit 51 calculates the rotation angle θa as a total angle in a range over 360 degrees, for example, by counting the number of rotations of the steering-side motor 13 from a steering midpoint which is a position of the steering wheel 3 when the vehicle moves straight ahead. The steering angle calculating unit 51 calculates the steering angle θs by multiplying a conversion factor based on a rotation speed proportion of the steering-side reduction gear mechanism 14 by the total angle acquired by conversion. The acquired steering angle θs is output to the target reaction torque calculating unit 52. The steering angle θs is output to the turning-side control unit 60, that is, a steering angle ratio change control unit 62 which will be described later.

The steering torque Th, the vehicle speed V, the turning-side actual current value Ib, the steering angle θs, the pinion angle θp, and the target pinion angle θp* which will be described later are input to the target reaction torque calculating unit 52. The target reaction torque calculating unit 52 calculates a target reaction torque Ts* which is a target reaction control value of the steering reaction force of the steering wheel 3 which is to be generated by the steering-side motor 13 based on the steering torque Th, the vehicle speed V, the turning-side actual current value Ib, the steering angle θs, the pinion angle θp, and the target pinion angle θp*. In this embodiment, the target reaction torque Ts* is an example of a torque command value, the target reaction torque calculating unit 52 is an example of a torque command value calculating unit.

Specifically, the target reaction torque calculating unit 52 includes a steering force calculating unit 55 and an axial force calculating unit 56. The steering torque Th and the vehicle speed V are input to the steering force calculating unit 55. The steering force calculating unit 55 calculates a steering force Tb* based on the steering torque Th and the vehicle speed V. The steering force Tb* acts in the same direction as a driver's steering direction. The steering force calculating unit 55 calculates the steering force Tb* such that the absolute value thereof increases as the absolute value of the steering torque Th increases and the vehicle speed V decreases. The steering force Tb* is calculated as a value with the dimension of a torque (N·m). The acquired steering force Tb* is output to a subtractor 57.

The vehicle speed V, the steering angle θs, the turning-side actual current value Ib, the pinion angle θp, and the target pinion angle θp* which will be described later are input to the axial force calculating unit 56. The axial force calculating unit 56 calculates an axial force F applied to the rack shaft 22 via the turning wheels 5 based on the vehicle speed V, the steering angle θs, the turning-side actual current value Ib, the pinion angle θp, and the target pinion angle θp*. The axial force F is calculated as a value with the dimension (N·m) of a torque. The axial force F acts in a direction opposite to a driver's steering direction. The subtractor 57 calculates a target reaction torque Ts* by subtracting the axial force F from the steering force Tb*. The acquired target reaction torque Ts* is output to the power supply control unit 53.

The target reaction torque Ts*, the rotation angle θa, and the steering-side actual current value Ia are input to the power supply control unit 53. The power supply control unit 53 calculates a current command value Ia* for the steering-side motor 13 based on the target reaction torque Ts*. The power supply control unit 53 calculates a difference between the current command value Ia* and a current value on a d-q coordinate system acquired by converting the steering-side actual current value Ia based on the rotation angle θa, and controls supply of electric power to the steering-side motor 13 such that the difference is cancelled out. The steering-side motor 13 generates a torque corresponding to the target reaction torque Ts*. Accordingly, it is possible to give an appropriate feeling of response to a driver.

Turning-Side Control Unit

The steering angle θs, the vehicle speed V, and the rotation angle θb are input to the turning-side control unit 60. The turning-side control unit 60 controls supply of electric power to the turning-side motor 32 based on the steering angle θs, the vehicle speed V, and the rotation angle θb.

The turning-side control unit 60 includes a pinion angle calculating unit 61, a steering angle ratio change control unit 62, a pinion angle feedback control unit ("pinion angle F/B control unit" in FIG. 2) 63, and a power supply control unit 64.

The rotation angle θb is input to the pinion angle calculating unit 61. The pinion angle calculating unit 61 converts the rotation angle θb to a total angle including a range over 360 degrees, for example, by counting the number of rotations of the turning-side motor 32 from a rack midpoint which is a position of the rack shaft 22 when the vehicle travels straight ahead. The pinion angle calculating unit 61 calculates the pinion angle θp which is an actual rotation angle of the pinion shaft 21 by multiplying a conversion factor based on a reduction gear ratio of the transmission mechanism 33, a lead of the conversion mechanism 34, and a rotation speed ratio of the rack and pinion mechanism 24 by the total angle which is acquired by conversion. For example, the pinion angle θp is calculated as a positive value when it is an angle on the right side of the rack midpoint and is calculated as a negative value when it is an angle on the left side of the rack midpoint. The acquired pinion angle θp is output to the pinion angle feedback control unit 63. The pinion angle θp is output to the steering-side control unit 50, that is, the axial force calculating unit 56 of the target reaction torque calculating unit 52.

The vehicle speed V and the steering angle θs are input to the steering angle ratio change control unit 62. The steering angle ratio change control unit 62 calculates the target pinion angle θp* by adding an amount of adjustment to the steering angle θs. The steering angle ratio change control unit 62 changes an amount of adjustment for changing a steering angle ratio which is a ratio of the target pinion angle θp* to the steering angle θs according to the vehicle speed V. For example, the amount of adjustment is changed such that a change of the target pinion angle θp* with respect to a change of the steering angle θs is larger when the vehicle speed V is low than that when the vehicle speed V is high. There is a correlation between the steering angle θs and the target pinion angle θp*. The pinion angle θp is controlled based on the target pinion angle θp*. Accordingly, there is also a correlation between the steering angle θs and the pinion angle θp.

The target pinion angle θp* and the pinion angle θp are input to the pinion angle feedback control unit 63. The pinion angle feedback control unit 63 performs PID control using a proportional term, an integral term, and a differential term as feedback control of the pinion angle θp such that the pinion angle θp conforms to the target pinion angle θp*. That is, the pinion angle feedback control unit 63 calculates a difference between the target pinion angle θp* and the pinion angle θp and calculates a turning force command value T* which is a target control value for the turning force such that the difference is cancelled out.

The turning force command value T*, the rotation angle θb, and the turning-side actual current value Ib are input to the power supply control unit 64. The power supply control unit 64 calculates a current command value Ib* for the turning-side motor 32 based on the turning force command value T*. The power supply control unit 64 calculates a difference between the current command value Ib* and a current value on the d-q coordinate system acquired by converting the turning-side actual current value Ib based on the rotation angle θb, and controls supply of electric power to the turning-side motor 32 such that the difference is cancelled out. Accordingly, the turning-side motor 32 rotates by an angle corresponding to the turning force command value T*.

Axial Force Calculating Unit

Figure 3:
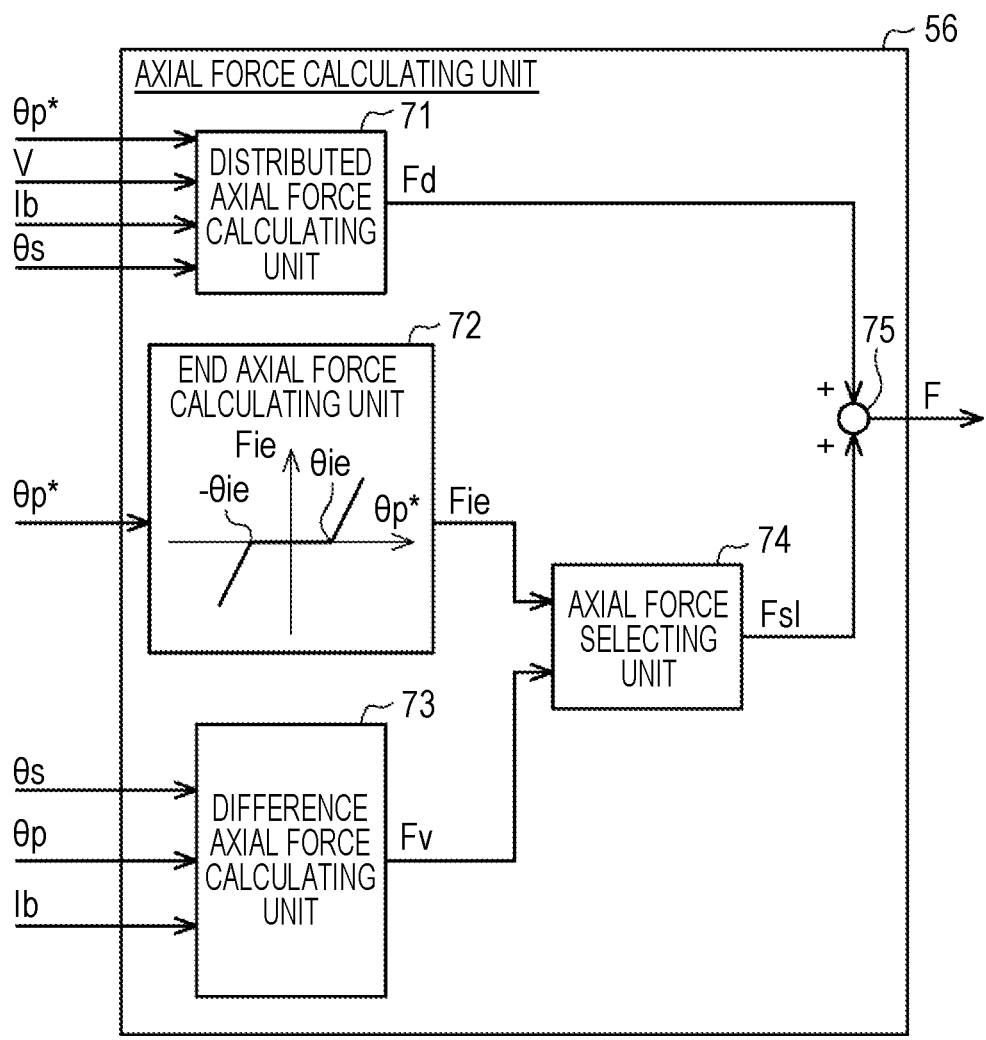
FIG. 3 is a block diagram illustrating functions of an axial force calculating unit.

The functions of the axial force calculating unit 56 will be described below in more detail. As illustrated in FIG. 3, the axial force calculating unit 56 includes a distributed axial force calculating unit 71, an end axial force calculating unit 72, a difference axial force calculating unit 73, and an axial force selecting unit 74.

The distributed axial force calculating unit 71 calculates a distributed axial force Fd based on an axial force acting on the rack shaft 22. The distributed axial force Fd corresponds to a calculational axial force which is obtained by estimating the axial force acting on the rack shaft 22 by distributing an angle axial force Fr and a current axial force Fi which will be described later at distribution proportions thereof such that the axial force acting on the rack shaft 22 via the turning wheels 5 is appropriately reflected. The acquired distributed axial force Fd is output to an adder 75. In this embodiment, the distributed axial force Fd is an example of a torque component.

The end axial force calculating unit 72 calculates an end axial force Fie for transmitting a situation in which a steering limit of the steering wheel 3, that is, a turning limit of the turning wheels 5, has been reached to a driver. The end axial force Fie corresponds to a force against steering of the steering wheel 3 such that additional steering of the steering wheel 3 to a side exceeding a steering angle limit corresponding to the steering limit is limited when the absolute value of the steering angle θs approaches the steering angle limit.

The target pinion angle θp* is input to the end axial force calculating unit 72. The end axial force calculating unit 72 calculates an end axial force Fie based on the target pinion angle θp*. Specifically, the end axial force calculating unit 72 includes an end axial force map in which a relationship between the target pinion angle θp* and the end axial force Fie is defined, and map-calculates the end axial force Fie with the target pinion angle θp* as an input. When the absolute value of the target pinion angle θp* is equal to or less than a threshold angle θie, the end axial force calculating unit 72 calculates the end axial force Fie as "0." When the absolute value of the target pinion angle θp* is greater than the threshold angle θie, the end axial force calculating unit 72 determines that the steering angle θs exceeds the steering angle limit and calculates the end axial force Fie such that the absolute value thereof is greater than "0." The end axial force Fie is set such that the absolute value thereof becomes large to an extent that additional steering of the steering wheel 3 is not possible with a human hand when the absolute value of the target pinion angle θp* increases over the threshold angle θie. The acquired end axial force Fie is output to the axial force selecting unit 74.

The difference axial force calculating unit 73 calculates a difference axial force Fv for transmitting a situation in which a relationship between the steering state of the steering wheel 3 and the turning state of the turning wheels 5 according to the steering angle ratio changes to a driver when such a change occurs. An example of the case in which a relationship between the steering state of the steering wheel 3 and the turning state of the turning wheels 5 according to the steering angle ratio changes is a situation in which the turning wheels 5 come into contact with an obstacle such as a curbstone. In this case, the turning wheels 5 cannot be turned to the obstacle side but there is a likelihood that the steering wheel 3 will be steered to the obstacle side over a stop position of the steering wheel 3 corresponding to a stop position of the turning wheels 5. This is because a power transmission path between the steering unit 4 and the turning unit 6 is cut off. Another example of the case in which a relationship between the steering state of the steering wheel 3 and the turning state of the turning wheels 5 according to the steering angle ratio changes is a situation in which the operation of the turning-side motor 32 is limited for protection from overheating and thus the correlation between the steering angle θs and the pinion angle θp collapses. This is because the pinion angle θp is less likely to conform to the target pinion angle θp*. The difference axial force Fv corresponds to a force against steering of the steering wheel 3 such that additional steering of the steering wheel 3 is limited when the turning wheels 5 come into contact with an obstacle such as a curbstone. The difference axial force Fv corresponds to a force against steering of the steering wheel 3 such that the steering of the steering wheel 3 is limited to secure conformability of the pinion angle θp to the target pinion angle θp* when the operation of the turning-side motor 32 is limited for protection from overheating.

The steering angle θs, the pinion angle θp, and the turning-side actual current value Ib are input to the difference axial force calculating unit 73. The difference axial force calculating unit 73 calculates a converted angle obtained by converting the pinion angle θp which is expressed as an index value of the turning angle such that it is expressed as an index value of the steering angle according to the steering angle ratio by adding the amount of adjustment to the pinion angle θp. The difference axial force calculating unit 73 changes the amount of adjustment according to the vehicle speed V such that a calculation rule defined by the steering angle ratio change control unit 62 changes to a calculation rule in which a relationship between an input and an output thereof is inverted. The difference axial force calculating unit 73 calculates the difference axial force Fv based on a difference obtained by subtracting the converted angle from the steering angle θs. Specifically, the difference axial force calculating unit 73 includes a difference axial force map in which a relationship between an absolute value of the difference and the difference axial force Fv is defined, and map-calculates the difference axial force Fv with the difference as an input. The difference axial force calculating unit 73 sets the sign of the difference axial force Fv based on the turning-side actual current value Ib. That is, the difference axial force calculating unit 73 sets the difference axial force Fv to be positive when the turning-side actual current value Ib is a positive value including a zero value and sets the difference axial force Fv to be negative when the turning-side actual current value Ib is a negative value. The acquired difference axial force Fv is output to the axial force selecting unit 74.

The end axial force Fie and the difference axial force Fv are input to the axial force selecting unit 74. The axial force selecting unit 74 selects an axial force having the larger absolute value out of the end axial force Fie and the difference axial force Fv, and calculates the selected axial force as a selected axial force Fs1. The adder 75 calculates the axial force F by adding the selected axial force Fs1 to the distributed axial force Fd. As illustrated in FIG. 2, the acquired axial force F is output to the subtractor 57. The subtractor 57 calculates the target reaction torque Ts* by subtracting the axial force F from the steering force Tb*. The acquired target reaction torque Ts* is output to the power supply control unit 53.

Distributed Axial Force Calculating Unit

Figure 4:
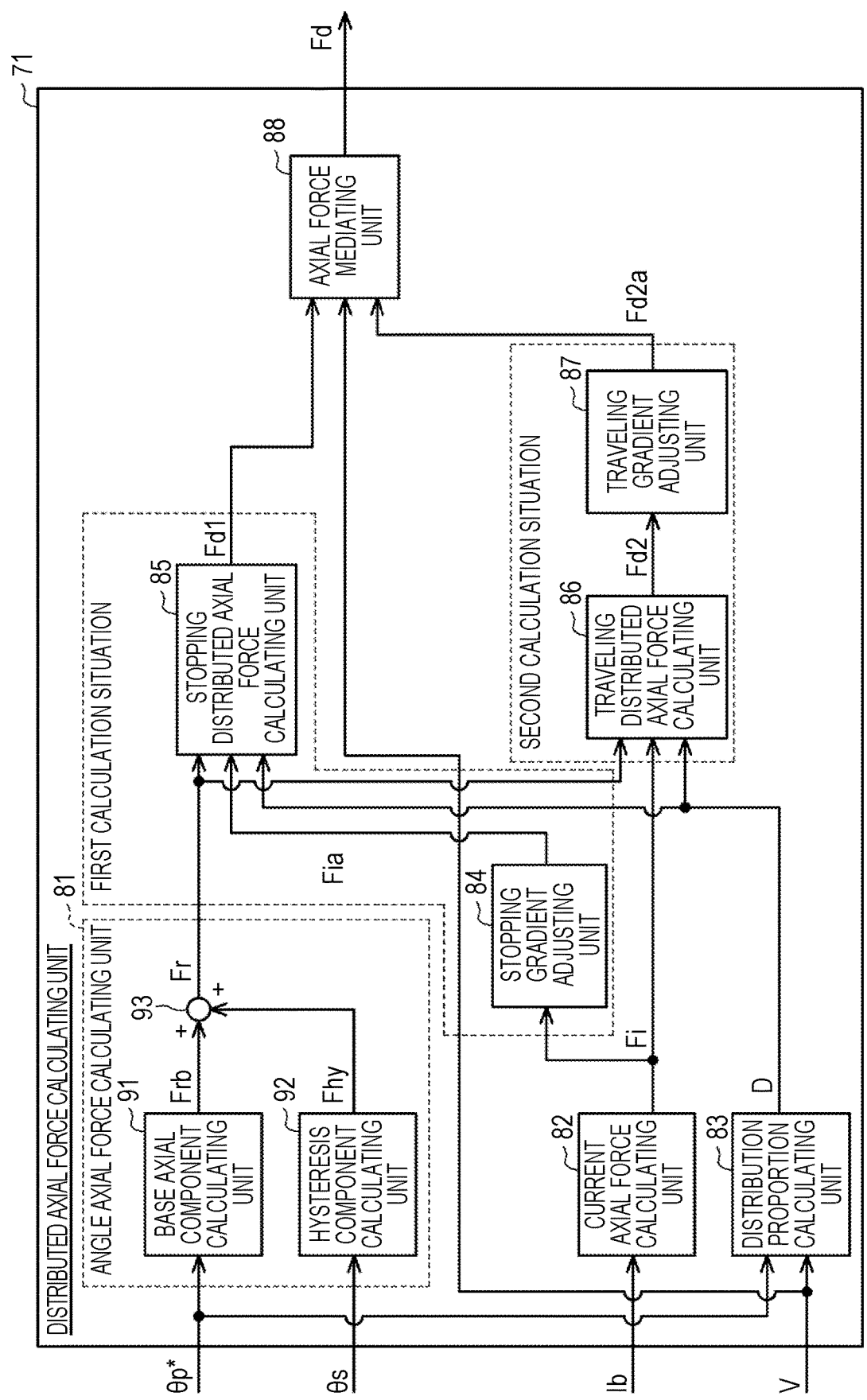
FIG. 4 is a block diagram illustrating functions of a distributed axial force calculating unit.

The function of the distributed axial force calculating unit 71 will be described below in more detail. As illustrated in FIG. 4, the distributed axial force calculating unit 71 includes an angle axial force calculating unit 81, a current axial force calculating unit 82, a distribution proportion calculating unit 83, a stopping gradient adjusting unit 84, a stopping distributed axial force calculating unit 85, a traveling distributed axial force calculating unit 86, a traveling gradient adjusting unit 87, and an axial force mediating unit 88.

Specifically, the angle axial force calculating unit 81 includes an axial force base component calculating unit 91 and a hysteresis component calculating unit 92. The target pinion angle θp* is input to the axial force base component calculating unit 91. The axial force base component calculating unit 91 calculates an axial force base component Frb which is a base component of the angle axial force Fr based on the target pinion angle θp*. The angle axial force Fr is an ideal value of an axial force which is defined by a model for a vehicle which is arbitrarily set. The angle axial force Fr is calculated as an axial force in which road surface information is not reflected. Road surface information is information such as fine unevenness not affecting a behavior in the lateral direction of the vehicle or a stepped portion affecting the behavior in the lateral direction of the vehicle. Specifically, the axial force base component calculating unit 91 calculates the axial force base component Frb such that the absolute value thereof increases as the absolute value of the target pinion angle θp* increases. The axial force base component Frb is calculated as a value with the dimension of a torque (N·m). The acquired axial force base component Frb is output to an adder 93.

The steering angle θs is input to the hysteresis component calculating unit 92. The hysteresis component calculating unit 92 calculates a hysteresis component Fhy which is a component to be added to the axial force base component Frb such that the angle axial force Fr has hysteresis characteristics based on the steering angle θs.

Figure 5A:
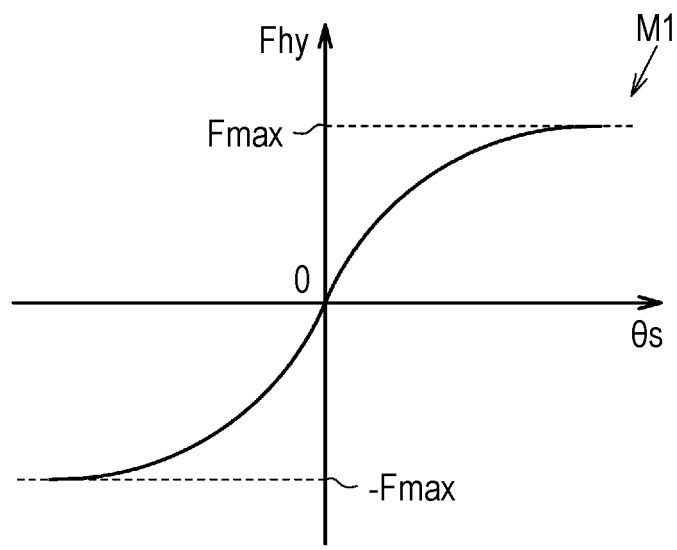
FIG. 5A is a graph illustrating a relationship between a steering angle and a hysteresis component at the time of turn steering.
Figure 5B:
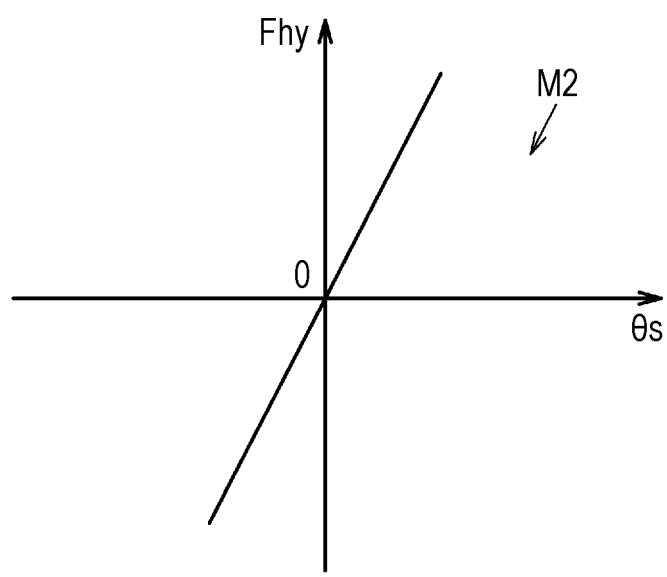
FIG. 5B is a graph illustrating a relationship between a steering angle and a hysteresis component at the time of return steering.

As illustrated in FIGS. 5A and 5B, the hysteresis component calculating unit 92 includes hysteresis maps M1 and M2 in which a relationship between the steering angle θs and the hysteresis component Fhy is defined. The hysteresis component calculating unit 92 map-calculates the hysteresis component Fhy using one of the hysteresis maps M1 and M2 depending on turn steering or return steering which is determined based on the sign and change of the steering angle θs. In this embodiment, the turn steering is steering of which the steering direction is kept constant. In this embodiment, the return steering is steering in a predetermined slight range of the steering angle θs after the steering direction has been changed. In the hysteresis maps M1 and M2, "θs" represents a rate of change of the steering angle θs when the steering angle θs at a start position of the turn steering or the return steering is defined as an origin.

Specifically, the hysteresis component calculating unit 92 calculates the hysteresis component Fhy using the hysteresis map M1 at the time of turn steering. In this case, the hysteresis component Fhy is calculated such that the absolute value thereof increases and the absolute value of a hysteresis gradient which is rate of change at the time of rising of the hysteresis component Fhy with respect to the steering angle θs decreases as the absolute value of the steering angle θs increases. The absolute value of the hysteresis component Fhy in this case is saturated in a range in which the steering angle θs is equal to or greater than a predetermined value and is calculated such that a maximum value at that time is equal to or less than a maximum value Fmax.

The hysteresis component calculating unit 92 uses a value appearing in a first quadrant with the steering angle θs at the start position of the turn steering as the origin of the hysteresis map M1 at the time of turn steering to right. The hysteresis component calculating unit 92 uses a value appearing in a third quadrant with the steering angle θs at the start position of the turn steering as the origin of the hysteresis map M1 at the time of turn steering to left.

On the other hand, the hysteresis component calculating unit 92 calculates the hysteresis component Fhy using the hysteresis map M2 at the time of return steering. In this case, the hysteresis component Fhy is calculated to be proportional to the steering angle θs. The hysteresis component Fhy in this case is calculated only when the steering angle θs is within a predetermined range from the origin.

The hysteresis component calculating unit 92 uses a value appearing in the first quadrant only when the steering angle θs is within a predetermined range from the origin with the steering angle θs at the start position of the return steering as the origin of the hysteresis map M2 at the time of return steering to right. The hysteresis component calculating unit 92 uses a value appearing in the third quadrant only when the steering angle θs is within a predetermined range from the origin with the steering angle θs at the start position of the return steering as the origin of the hysteresis map M2 at the time of return steering to left.

In this embodiment, the hysteresis maps M1 and M2 are configured to change the hysteresis component Fhy according to the vehicle speed V. The hysteresis maps M1 and M2 change the hysteresis component Fhy according to the vehicle speed V for the purpose of realization of a desired feeling of steering. In this embodiment, for example, the hysteresis component Fhy is changed such that the hysteresis gradient increases as the vehicle speed V decreases. The hysteresis component Fhy may be changed according to a steering speed which is a differential value of the steering angle θs. In this case, for example, the hysteresis component Fhy may be changed such that the hysteresis gradient decreases as the steering speed increases.

Accordingly, when sinusoidal steering in which turn steering and return steering of the steering wheel 3 are repeatedly performed periodically at a constant frequency is performed, the hysteresis component calculating unit 92 calculates the calculational hysteresis component Fhy such that hysteresis characteristics with respect to change of the steering angle θs are provided. The acquired hysteresis component Fhy is output to the adder 93. The adder 93 calculates the angle axial force Fr by adding the hysteresis component Fhy to the axial force base component Frb. The acquired angle axial force Fr is output to the stopping distributed axial force calculating unit 85 and the traveling distributed axial force calculating unit 86.

In this embodiment, the pinion angle θp and the target pinion angle θp* are an example of a first status variable changing according to operation of the steering system 2. When the steering angle θs is set as an example of a specific status variable changing according to the operation of the steering system 2, the pinion angle θp and the target pinion angle θp* are correlated with the steering angle θs and change by interlocking with the steering angle θs. Accordingly, the pinion angle θp and the target pinion angle θp* do not basically have hysteresis characteristics with respect to the steering angle θs. That is, the angle axial force calculating unit 81 is an example of a first component calculating unit. The angle axial force Fr is an example of a first component.

The turning-side actual current value Ib is input to the current axial force calculating unit 82. The current axial force calculating unit 82 calculates the current axial force Fi based on the turning-side actual current value Ib. The current axial force Fi is an estimated value of an axial force actually acting on the rack shaft 22 that operates to turn the turning wheels 5, that is, an axial force which is actually transmitted to the rack shaft 22. The current axial force Fi is calculated as an axial force in which the road surface information is reflected. Specifically, the current axial force calculating unit 82 calculates the current axial force Fi based on the assumption that a torque applied to the rack shaft 22 by the turning-side motor 32 and a torque corresponding to a force applied to the rack shaft 22 via the turning wheels 5 are balanced such that the absolute value of the current axial force Fi increases as the absolute value of the turning-side actual current value Ib increases. The current axial force Fi is calculated as a value having the dimension of a torque (N·m). The calculated current axial force Fi is output to the stopping gradient adjusting unit 84 and the traveling distributed axial force calculating unit 86.

In this embodiment, the turning-side actual current value Ib is an example of a second state variable changing with the operation of the steering system 2. When the steering angle θs is set as an example of the specific state variable changing according to the operation of the steering system 2, the turning-side actual current value Ib changes along with the axial force actually acting on the turning wheels 5 according to the pinion angle θp correlated with the steering angle θs. The axial force actually acting on the turning wheels 5 has hysteresis characteristics with respect to change of the pinion angle θp. Accordingly, the turning-side actual current value Ib basically has hysteresis characteristics with respect to the steering angle θs. That is, the current axial force calculating unit 82 is an example of a second component calculating unit. The current axial force Fi is an example of a second component.

The target pinion angle θp* and the vehicle speed V are input to the distribution proportion calculating unit 83. The distribution proportion calculating unit 83 calculates a distribution gain D based on the target pinion angle θp* and the vehicle speed V. The distribution gain D is a distribution proportion of the current axial force Fi when the angle axial force Fr and the current axial force Fi are distributed to acquire the distributed axial force Fd. Specifically, the distribution proportion calculating unit 83 includes a distribution gain map in which a relationship between the target pinion angle θp* and the vehicle speed V and the distribution gain D is defined, and map-calculates the distribution gain D with the target pinion angle θp* and the vehicle speed V as an input. The acquired distribution gain D is output to the stopping distributed axial force calculating unit 85 and the traveling distributed axial force calculating unit 86.

The distribution gain D changes to approach "1 (100%)" as the vehicle speed V approaches a zero value in a range of a first vehicle speed which is a low vehicle speed including a stopped state such as lower than 6 km/h. In this case, at the first vehicle speed, the angle axial force Fr and the current axial force Fi are distributed such that an influence of the current axial force Fi on the distributed axial force Fd is dominant. The distribution gain D changes to approach a "zero value (0%)" as the vehicle speed V increases in a range of a second vehicle speed including a traveling state of a middle or high speed such as equal to or higher than 6 km/h. In this case, at the second vehicle speed, the angle axial force Fr and the current axial force Fi are distributed such that an influence of the angle axial force Fr on the distributed axial force Fd is dominant.

The distribution gain D changes such that a value thereof becomes larger when the target pinion angle θp* is large than when the target pinion angle θp* is small. On the other hand, the distribution gain D changes such that a value thereof becomes smaller when the target pinion angle θp* is small than when the target pinion angle θp* is large. In this case, at the first vehicle speed, the tendency that the influence of the current axial force Fi on the distributed axial force Fd is dominant becomes stronger as the target pinion angle θp* becomes larger. On the other hand, at the first vehicle speed, the tendency that the influence of the current axial force Fi on the distributed axial force Fd is dominant becomes weaker as the target pinion angle θp* becomes smaller.

In some cases, the distribution gain D may be "1 (100%) or a "zero value (0%)," where only one of the angle axial force Fr and the current axial force Fi is distributed to the distributed axial force Fd. That is, the distribution gain D in this embodiment includes a concept of zero value.

The current axial force Fi is input to the stopping gradient adjusting unit 84. The stopping gradient adjusting unit 84 calculates a post-adjustment current axial force Fia acquired by adjusting the current axial force Fi such that the magnitude of the axial force gradient indicating a mode of change of the current axial force Fi changes. Here, adjustment of the axial force gradient of the current axial force Fi corresponds to adjustment of the axial force gradient indicating the mode of change of the current axial force Fi with respect to the steering angle θs. Specifically, the stopping gradient adjusting unit 84 includes a gradient adjustment map M11 in which a relationship between the current axial force Fi and the post-adjustment current axial force Fia is defined and map-calculates the post-adjustment current axial force Fia with the current axial force Fi as an input. The acquired post-adjustment current axial force Fia is output to the stopping distributed axial force calculating unit 85.

Figure 6:
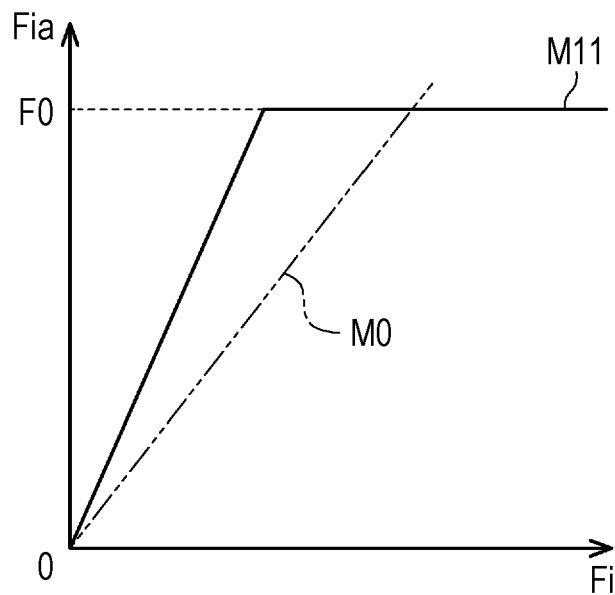
FIG. 6 is a graph illustrating an example of a gradient adjustment map at the time of stopping.

As illustrated in FIG. 6, the gradient adjustment map M11 is configured to have an amplification shape indicating a relationship in which an output value is larger than an input value in comparison with a proportional shape M0 indicating a relationship in which an input and an output are proportional. That is, the post-adjustment current axial force Fia is calculated as a value obtained by amplifying the absolute value of the current axial force Fi with respect to the current axial force Fi. An amplification rate of the post-adjustment current axial force Fia with respect to the current axial force Fi is maximized when the absolute value of the current axial force Fi is close to the zero value, decreases as the absolute value of the current axial force Fi increases, and is saturated in a range in which the absolute value of the current axial force Fi is equal to or greater than a predetermined value. A maximum value of the post-adjustment current axial force Fia when the amplification rate of the post-adjustment current axial force Fia with respect to the current axial force Fi is saturated is calculated as a maximum value F0. In this case, the axial force gradient of the post-adjustment current axial force Fia is larger than a pre-adjustment current axial force Fi when the absolute value of the current axial force Fi is close to the zero value. The amplification rate of the post-adjustment current axial force Fia with respect to the current axial force Fi or the gradient adjustment map M11 associated with the maximum value F0 is set by experiment, simulation, or the like from a point of view for curbing vibration characteristics in control and securing control stability even when control is continuously performed using the post-adjustment current axial force Fia.

Referring back to FIG. 4, the angle axial force Fr, the post-adjustment current axial force Fia, and the distribution gain D are input to the stopping distributed axial force calculating unit 85. The stopping distributed axial force calculating unit 85 calculates a stopping distributed axial force Fd1 by adding a value obtained by multiplying the post-adjustment current axial force Fia by the distribution gain D to a value obtained by multiplying the post-adjustment angle axial force Fr by a gain obtained by subtracting the distribution gain D from "1." That is, the stopping distributed axial force Fd1 is calculated as a component in which the axial force gradient of only the current axial force Fi out of the angle axial force Fr and the current axial force Fi which are distributed has been adjusted. On the other hand, the stopping distributed axial force Fd1 is calculated as a component in which the hysteresis gradient of the angle axial force Fr out of the angle axial force Fr and the current axial force Fi which are distributed has not been adjusted. The acquired stopping distributed axial force Fd1 is output to the axial force mediating unit 88.

In this embodiment, calculation which is realized by the functions of the stopping gradient adjusting unit 84 and the stopping distributed axial force calculating unit 85 corresponds to the first calculation situation in which the post-adjustment current axial force Fi obtained by adjusting the axial force gradient of the current axial force Fia is used to calculate the distributed axial force Fd.

The angle axial force Fr, the current axial force Fi, and the distribution gain D are input to the traveling distributed axial force calculating unit 86. The traveling distributed axial force calculating unit 86 calculates a traveling distributed axial force Fd2 by adding a value obtained by multiplying the current axial force Fi by the distribution gain D to a value obtained by multiplying the angle axial force Fr by a gain obtained by subtracting the distribution gain D from "1." The acquired traveling distributed axial force Fd2 is output to the traveling gradient adjusting unit 87.

The traveling distributed axial force Fd2 is input to the traveling gradient adjusting unit 87. The traveling gradient adjusting unit 87 calculates a post-adjustment traveling distributed axial force Fd2a by adjusting the traveling distributed axial force Fd2 such that the magnitude of the axial force gradient indicating the mode of change of the traveling distributed axial force Fd2 changes. Here, adjustment of the traveling distributed axial force Fd2 corresponds to adjustment of the hysteresis gradient indicating the mode of change of the angle axial force Fr included in the traveling distributed axial force Fd2 with respect to the steering angle θs. Adjustment of the axial force gradient of the traveling distributed axial force Fd2 corresponds to adjustment of the axial force gradient indicating the mode of change of the current axial force Fi included in the traveling distributed axial force Fd2 with respect to the steering angle θs. Specifically, the traveling gradient adjusting unit 87 includes a gradient adjustment map M12 in which a relationship between the traveling distributed axial force Fd2 and the post-adjustment traveling distributed axial force Fd2a is defined and map-calculates the post-adjustment traveling distributed axial force Fd2a with the traveling distributed axial force Fd2 as an input. That is, the post-adjustment traveling distributed axial force Fd2a is calculated as a component in which the hysteresis gradient of the angle axial force Fr which is distributed has been adjusted and the axial force gradient of the current axial force Fi which is distributed has been adjusted. The acquired post-adjustment traveling distributed axial force Fd2a is output to the axial force mediating unit 88.

Figure 7:
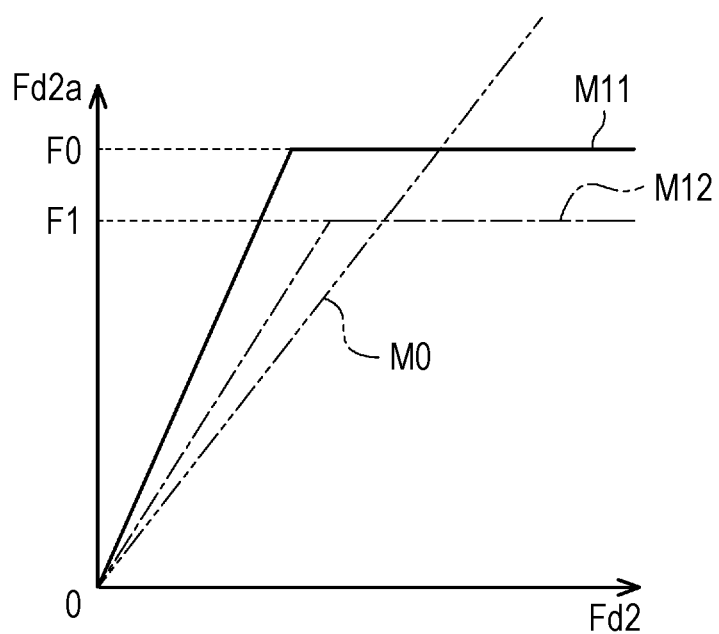
FIG. 7 is a graph illustrating an example of a gradient adjustment map at the time of traveling.

As illustrated in FIG. 7, the gradient adjustment map M12 is configured to have an amplification shape indicating a relationship in which an output value is larger than an input value in comparison with the proportional shape M0 indicating a relationship in which an input and an output are proportional. That is, the post-adjustment traveling distributed axial force Fd2a is calculated as a value obtained by amplifying the absolute value of the traveling distributed axial force Fd2 with respect to the traveling distributed axial force Fd2. An amplification rate of the post-adjustment traveling distributed axial force Fd2a with respect to the traveling distributed axial force Fd2 is maximized when the absolute value of the traveling distributed axial force Fd2 is close to the zero value, decreases as the absolute value of the traveling distributed axial force Fd2 increases, and is saturated in a range in which the absolute value of the traveling distributed axial force Fd2 is equal to or greater than a predetermined value. A maximum value of the post-adjustment traveling distributed axial force Fd2a when the amplification rate of the post-adjustment traveling distributed axial force Fd2a with respect to the traveling distributed axial force Fd2 is saturated is calculated as a maximum value F1. In this case, the axial force gradient of the post-adjustment traveling distributed axial force Fd2a is larger than a pre-adjustment traveling distributed axial force Fd2 when the absolute value of the traveling distributed axial force Fd2 is close to the zero value. The amplification rate of the post-adjustment traveling distributed axial force Fd2a with respect to the traveling distributed axial force Fd2 is set to be smaller than the amplification rate when the absolute value of the current axial force Fi in the gradient adjustment map M11 is close to the zero value. The maximum value F1 is set to be smaller than the maximum value F0 in the gradient adjustment map M11. The amplification rate of the post-adjustment traveling distributed axial force Fd2a with respect to the traveling distributed axial force Fd2 or the gradient adjustment map M12 associated with the maximum value F1 is set by experiment, simulation, or the like from a point of view for curbing vibration characteristics in control and securing control stability even when control is continuously performed using the post-adjustment traveling distributed axial force Fd2a.

In this embodiment, calculation which is realized by the functions of the traveling distributed axial force calculating unit 86 and the traveling gradient adjusting unit 87 corresponds to the second calculation situation in which the post-adjustment traveling distributed axial force Fd2a obtained by adjusting the hysteresis gradient of the angle axial force Fr and adjusting the axial force gradient of the current axial force Fi is used to calculate the distributed axial force Fd.

The stopping distributed axial force Fd1, the post-adjustment traveling distributed axial force Fd2a, and the vehicle speed V are input to the axial force mediating unit 88. In the distributed axial force calculating unit 71, the first calculation situation which is realized by the functions of the stopping gradient adjusting unit 84 and the stopping distributed axial force calculating unit 85 and the second calculation situation which is realized by the functions of the traveling distributed axial force calculating unit 86 and the traveling gradient adjusting unit 87 are performed in parallel, and the stopping distributed axial force Fd1 and the post-adjustment traveling distributed axial force Fd2a are acquired. The stopping distributed axial force Fd1 and the post-adjustment traveling distributed axial force Fd2a are input to the axial force mediating unit 88 in parallel. The axial force mediating unit 88 performs mediation based on the vehicle speed V while summing the stopping distributed axial force Fd1 and the post-adjustment traveling distributed axial force Fd2a at predetermined distribution proportions.

Specifically, when the vehicle speed V indicating a first vehicle speed is input, the axial force mediating unit 88 calculates the distributed axial force Fd by setting the distribution proportion of the stopping distributed axial force Fd1 to "100%" and setting the distribution proportion of the post-adjustment traveling distributed axial force Fd2a to "zero value." In this case, the axial force mediating unit 88 mediates such that the stopping distributed axial force Fd1 is output as the distributed axial force Fd. On the other hand, when the vehicle speed V indicating a second vehicle speed is input, the axial force mediating unit 88 calculates the distributed axial force Fd by setting the distribution proportion of the stopping distributed axial force Fd1 to "zero value" and setting the distribution proportion of the post-adjustment traveling distributed axial force Fd2a to "100%."

In this case, the axial force mediating unit 88 mediates such that the post-adjustment distributed axial force Fd2a is output as the distributed axial force Fd. As illustrated in FIG. 3, the acquired distributed axial force Fd is output to the adder 75.

As illustrated in FIG. 4, the axial force mediating unit 88 has a function of gradually changing the distribution proportions of the stopping distributed axial force Fd1 and the post-adjustment traveling distributed axial force Fd2a when the vehicle speed V changing between the first vehicle speed and the second vehicle speed is input in an immediately previous cycle (one cycle before). When the vehicle speed V changing between the first vehicle speed and the second vehicle speed is input in an immediately previous cycle (one cycle before), a component which is output as the distributed axial force Fd, that is, a component which is reflected in the target reaction torque Ts*, is switched between the stopping distributed axial force Fd1 and the post-adjustment traveling distributed axial force Fd2a. When the vehicle speed V changing between the first vehicle speed and the second vehicle speed is input in an immediately previous cycle (one cycle before), the axial force mediating unit 88 performs a process of slowly changing the distribution proportions of the stopping distributed axial force Fd1 and the post-adjustment traveling distributed axial force Fd2a with the elapse of time.

For example, when the vehicle speed V changes from the first vehicle speed to the second vehicle speed, the axial force mediating unit 88 slowly changes the distribution proportion of the stopping distributed axial force Fd1 with the elapse of time while switching the distribution proportion from "100%" to "zero value." In this case, the axial force mediating unit 88 slowly changes the distribution proportion of the post-adjustment traveling distributed axial force Fd2a with the elapse of time while switching the distribution proportion from "zero value" to "100%." That is, when the component which is output as the distributed axial force Fd, that is, the component which is reflected in the target reaction torque Ts*, is switched between the stopping distributed axial force Fd1 and the post-adjustment traveling distributed axial force Fd2a, the axial force mediating unit 88 has a function of compensating for the distributed axial force Fd such that sudden change of the distributed axial force Fd between before and after the switching is curbed.

As a method of slowly changing the distribution proportions of the stopping distributed axial force Fd1 and the post-adjustment traveling distributed axial force Fd2a, for example, the axial force mediating unit 88 may acquire a difference of one distribution proportion between before and after the switching and calculate the difference as an offset value. In this case, the axial force mediating unit 88 changes the post-switching distribution proportion to the pre-switching distribution proportion by the offset value such that the post-switching distribution proportion becomes the original post-switching value soon by slowly decreasing the offset value with the elapse of time. The stopping gradient adjusting unit 84, the stopping distributed axial force calculating unit 85, the traveling distributed axial force calculating unit 86, the traveling gradient adjusting unit 87, and the axial force mediating unit 88 are an example of a torque component calculating unit.

Operations of this embodiment will be described below. In this embodiment, the distributed axial force Fd is calculated separately using the stopping distributed axial force Fd1 and the post-adjustment traveling distributed axial force Fd2a according to situations. Particularly, when the vehicle speed V is the first vehicle speed, the stopping distributed axial force Fd1 is used as the distributed axial force Fd. That is, when the vehicle moves slowly straight ahead at the vehicle speed V indicating the first vehicle speed, the target pinion angle θp* is small, an influence of the current axial force Fi on the distributed axial force Fd is weak, and adjustment using the gradient adjustment map M11 is performed such that the axial force gradient of the current axial force Fi increases to compensate for the influence. In this case, since the vehicle speed V is the first vehicle speed, the hysteresis gradient of the angle axial force Fr increases and adjustment using the gradient adjustment map M11 is not performed such that the hysteresis gradient is not larger than expected.

For example, it is assumed that the vehicle slowly travels straight ahead on a travel road with a stepped portion, that is, a groove shape with fine unevenness, at the vehicle speed V indicating the first vehicle speed. In this case, even when the turning wheels 5 go over the stepped portion of the travel road with the groove shape, it is thought that the absolute value of the current axial force Fi is small due to the small stepped portion. On the other hand, the post-adjustment current axial force Fia adjusted using the gradient adjustment map M11 is calculated as a value obtained by amplifying the absolute value of the current axial force Fi even if the absolute value of the current axial force Fi is a small value close to zero value. That is, in a situation in which the vehicle slowly travels straight ahead on the travel road of a groove shape with a small stepped portion, a driver can be accurately informed that the turning wheels 5 go over the stepped portion of the travel road with a groove shape. In this case, the hysteresis gradient of the angle axial force Fr not adjusted using the gradient adjustment map M11 is prevented from becoming larger than expected.

On the other hand, when the post-adjustment traveling distributed axial force Fd2a is used as the distributed axial force Fd in a situation in which the vehicle speed V is the first vehicle speed, the post-adjustment current axial force Fia adjusted using the gradient adjustment map M12 is calculated as a value obtained by amplifying the absolute value of the current axial force Fi even if the absolute value of the current axial force Fi is a small value close to zero value. In this case, since the vehicle speed V is the first vehicle speed, the hysteresis gradient of the angle axial force Fr increases and adjustment using the gradient adjustment map M12 is performed such that the hysteresis gradient is larger than expected. That is, the hysteresis gradient of the angle axial force Fr adjusted using the gradient adjustment map M12 is larger than expected.

Advantages of this embodiment will be described below. In this embodiment, in a situation in which the vehicle speed V is the first vehicle speed, it is possible to curb vibration characteristics in control due to an increase of the hysteresis gradient of the angle axial force Fr more than expected while increasing the axial force gradient of the current axial force Fi using the stopping distributed axial force Fd1 as the distributed axial force Fd. Accordingly, it is possible to achieve improvement in control stability.

In a stopped state, it is possible to curb vibration characteristics in control due to an increase of the hysteresis gradient of the angle axial force Fr more than expected while increasing the axial force gradient of the current axial force Fi using the stopping distributed axial force Fd1 as the distributed axial force Fd. From a point of view of transmitting road surface conditions such as a road-surface reaction force to a driver, it is more preferable to increase the axial force gradient of the distributed axial force Fd in the stopped state out of the stopped state and the traveling state. That is, the situation in which the hysteresis gradient of the calculational hysteresis component Fhy added to the angle axial force Fr is supposed to be greater than expected corresponds to the stopped state out of the stopped state and the traveling state. Accordingly, it is possible to achieve improvement in control stability by realizing a preferable mode from a point of view of transmitting road surface conditions such as a road-surface reaction force to a driver.

The stopping distributed axial force Fd1 and the post-adjustment traveling distributed axial force Fd2a acquired through parallel calculation are reflected in the target reaction torque Ts* through mediation of the axial force mediating unit 88. In this case, the stopping distributed axial force Fd1 and the post-adjustment traveling distributed axial force Fd2a can be reflected in the target reaction torque Ts* in consideration of a situation as new as possible. Accordingly, it is possible to more accurately determine a situation in which improvement in control stability is to be achieved.

By using the function of the axial force mediating unit 88, it is possible to curb sudden change of the distributed axial force Fd between before and after switching when the distributed axial force Fd which his reflected in the target reaction torque Ts* is switched between the stopping distributed axial force Fd1 and the post-adjustment traveling distributed axial force Fd2a.

The aforementioned embodiment may be modified as follows. The following modified examples can be combined unless technical conflictions arise. In the aforementioned embodiment, the units using the target pinion angle θp* may calculate various components based on a state variable correlated with the target pinion angle θp* instead of the target pinion angle θp*. Examples of the state variable correlated with the target pinion angle θp* include the pinion angle θp, the steering angle θs, the rotation angle θa, and the rotation angle θb, which are an example of the state variable changing according to the operation of the steering system 2. The target pinion angle θp or the angles correlated with the target pinion angle θp* are angles which are convertible to the turning angle of the turning wheels 5. That is, the axial force base component Frb or the end axial force Fie may be calculated, for example, based on the pinion angle θp. In this modified example, the same advantages as in the aforementioned embodiment are achieved. This is the same for the steering angle θs or the state variable correlated with the target pinion angle θp* such as the pinion angle θp. That is, the hysteresis component Fhy may be calculated, for example, based on the target pinion angle θp* instead of the steering angle θs.

As long as at least a state variable correlated with the operation of the steering wheel 3 is used to calculate the steering force Tb*, the steering force calculating unit 55 may not use the vehicle speed V or may use a combination with another element. As the state variable correlated with the operation of the steering wheel 3, the steering angle θs may be used instead of the steering torque Th described in the aforementioned embodiment or another element may be used.

As long as at least the steering angle θs is used to calculate the hysteresis component Fhy, the hysteresis component calculating unit 92 may use another element such as the vehicle speed V in combination.

As long as at least the target pinion angle θp* is used to calculate the axial force base component Frb, the axial force base component calculating unit 91 may use another element such as the vehicle speed V in combination.

As long as at least one of the vehicle speed V and the target pinion angle θp* is used to calculate the distribution gain D, the distribution proportion calculating unit 83 may use another element in combination.

The end axial force calculating unit 72 and the difference axial force calculating unit 73 may be deleted from the axial force calculating unit 56. In this case, the axial force selecting unit 74 and the adder 75 may be deleted. The distributed axial force Fd calculated by the distributed axial force calculating unit 71 is output to the subtractor 57.

The gradient adjustment map M11 may be used for map calculation using a combination with another element such as the vehicle speed V in addition to the current axial force Fi as an input. In this case, in the gradient adjustment map M11, the amplification rate of the post-adjustment current axial force Fia with respect to the current axial force Fi may change, for example, such that it decreases as the vehicle speed V increases.

The gradient adjustment map M12 may be used for map calculation using a combination with another element such as the vehicle speed V in addition to the traveling distributed axial force Fd2 as an input. In this case, in the gradient adjustment map M12, the amplification rate of the post-adjustment traveling distributed axial force Fd2a with respect to the traveling distributed axial force Fd2 may change, for example, such that it decreases as the vehicle speed V increases, or the map may be configured to have an attenuation shape indicating a relationship in which an output value is less than an input in comparison with the proportional shape M0.

The axial force mediating unit 88 may mediate the axial force reflected in the target reaction torque Ts* between the stopping distributed axial force Fd1 and the traveling distributed axial force Fd2a in consideration of the steering state of the steering unit 4 such as the steering angle θs or the turning state of the turning unit 6 such as the pinion angle θp instead of or in addition to the vehicle speed V. For example, a longitudinal acceleration of the vehicle or an accelerator or brake operation state of the vehicle from which the stopped state and the traveling state of the vehicle can be determined may be considered as the state variable used instead of the vehicle speed V.

The axial force mediating unit 88 slowly change the distribution proportions in consideration of the steering state of the steering unit 4 such as the steering angle θs or the turning state of the turning unit 6 such as the pinion angle θp instead of or in addition to the elapsed time.

The axial force mediating unit 88 may be configured to select one of the stopping distributed axial force Fd1 and the post-adjustment traveling distributed axial force Fd2a as the distributed axial force Fd or to switch the selected state based on the vehicle speed V.

A calculation situation may be switched such that only one of the first calculation situation which is realized by the functions of the stopping gradient adjusting unit 84 and the stopping distributed axial force calculating unit 85 and the second calculation situation which is realized by the functions of the traveling distributed axial force calculating unit 86 and the traveling gradient adjusting unit 87 functions based on the vehicle speed V. In this case, the axial force mediating unit 88 may be deleted.

As the component to which the calculational hysteresis component is added, a component such as the steering force Tb* or an axial force acquired in consideration of a yaw rate or a lateral acceleration can be appropriately used in addition to the angle axial force Fr as long as it is a component convenient for operating the steering system 2 because it has hysteresis characteristics. As the component based on a state variable having hysteresis characteristics with respect to change of the steering angle θs, a component such as an axial force acquired in consideration of an actual axial force acting on the rack shaft 22 or an axial force acquired in consideration of a tire force acting on the turning wheels 5 can be appropriately used in addition to the current axial force Fi. Even when the same problem as in the aforementioned embodiment is caused in the appropriately used component, this problem can be solved by employing a configuration based on the embodiment.

The hysteresis gradient or the axial force gradient is not limited to change of the steering angle θs, but can be appropriately modified for the change of the pinion angle θp or the target pinion angle θp* correlated with the steering angle θs, a state variable changing according to the operation of the steering system 2 without any correlation with the steering angle θs, or the like. Even when the same problem as in the aforementioned embodiment is caused in the appropriately changed hysteresis gradient or axial force gradient, this problem can be solved by employing a configuration based on the embodiment.

For example, a function of calculating an axial force by adjusting the hysteresis gradient of the angle axial force Fr in addition to the stopping distributed axial force Fd1 and the post-adjustment traveling distributed axial force Fd2a may be added to the distributed axial force calculating unit 71. By employing a configuration in which the axial force calculated by the added function is correlated with an appropriate situation, the same advantages as in the aforementioned embodiment can be achieved.

The range of the first vehicle speed may be set to a broader range such as a range less than 10 km/h or may be set to a narrower range such as a range less than 3 km/h as long as it includes the stopped state. This is the same for the range of the second vehicle speed. That is, the range of the second vehicle speed can be appropriately changed as long as it includes the traveling state.

In the aforementioned embodiment, the steering-side control unit 50 may be provided as a function of the turning-side control unit 60. In the aforementioned embodiment, the turning-side motor 32 may employ, for example, a configuration in which the turning-side motor 32 is disposed coaxially with the rack shaft 22 or a configuration in which the pinion shaft constituting the rack and pinion mechanism is connected to the rack shaft 22 via a worm and wheel.

In the aforementioned embodiment, the steering control device 1 can be configured as a processing circuit including (1) one or more processors that operate in accordance with a computer program (software), (2) one or more dedicated hardware circuits such as an application-specific integrated circuit (ASIC) that perform at least some of various processes, or (3) a combination thereof. The processor includes a CPU and memories such as a RAM and a ROM, and the memories store program codes or commands configured to cause the CPU to perform processing. Memories, that is, non-transitory computer-readable media, include all available media that can be accessed by a general-purpose or dedicated computer.

In the aforementioned embodiment, the steering system 2 employs a linkless structure in which the steering unit 4 and the turning unit 6 are normally mechanically disconnected from each other, but the disclosure is not limited thereto and the steering system may employ a structure in which the steering unit 4 and the turning unit 6 can be mechanically disconnected by a clutch. The steering system 2 may be an electric power steering system that applies an assist force which is a form for assisting with a driver's steering operation. In this case, the steering wheel 3 is mechanically connected to the pinion shaft 21 via the steering shaft 11.

What is claimed is:

1. A steering control device that controls a steering system in which a steering torque required for steering a steering wheel is changed using a motor torque applied from an actuator with a motor as a drive source, the steering control device comprising:
   a torque command value calculating unit configured to calculate a torque command value which is a target value of the motor torque when operation of the motor is controlled such that the motor torque is generated,
   wherein the torque command value calculating unit includes a first component calculating unit configured to calculate a first component based on a first state variable changing according to an operation of the steering system, a second component calculating unit configured to calculate a second component based on a second state variable changing with the operation of the steering system, and a torque component calculating unit configured to calculate a torque component used to calculate the torque command value based on at least one of the first component and the second component,
   wherein the torque command value calculating unit is configured to set the first state variable to a state variable not having hysteresis characteristics with respect to change of a specific state variable changing according to the operation of the steering system and to set the second state variable to a state variable having hysteresis characteristics with respect to change of the specific state variable,
   wherein the first component calculating unit is configured to add a calculational hysteresis component to the first component such that hysteresis characteristics with respect to change of the specific state variable are provided when the first component is calculated,
   wherein the torque component calculating unit is configured to perform calculation in a first calculation situation and calculation in a second calculation situation,
   wherein the first calculation situation is calculation for adjusting a gradient of the second component with respect to change of the specific state variable, the second component being acquired by the second component calculating unit, the adjusted second component being used to calculate the torque component, and
   wherein the second calculation situation is calculation for adjusting a gradient of the torque component with respect to change of the specific state variable, the torque component being acquired by calculation based on at least one of the first component and the second component, the adjusted torque component being calculated as the final torque component.

2. The steering control device according to claim 1, wherein the first component calculating unit is an angle axial force calculating unit configured to calculate an angle axial force, which is determined according to an angle which is able to be converted to a turning angle of turning wheels of a vehicle and which is an axial force in which road surface information is not reflected, as the first component, and
   wherein the second component calculating unit is a current axial force calculating unit configured to calculate a current axial force, which is determined according to a current supplied to the motor and which is an axial force in which road surface information is reflected, as the second component.

3. The steering control device according to claim 1, wherein the torque component calculating unit is configured to reflect the torque component acquired through calculation in the first calculation situation in the torque command value when a vehicle has a first vehicle speed including a stopped state, and
   wherein the torque component calculating unit is configured to reflect the torque component acquired through calculation in the second calculation situation in the torque command value when the vehicle has a second vehicle speed including a traveling state.

4. The steering control device according to claim 1, wherein the torque component calculating unit includes a mediation unit configured to mediate which of the torque components acquired through calculation in the first calculation situation and calculation in the second calculation situation is to be reflected in the torque command value while performing calculation in the first calculation situation and calculation in the second calculation situation in parallel,
   wherein the mediation unit is configured to reflect the torque component acquired through calculation in the first calculation situation in the torque command value when the vehicle has a first vehicle speed including a stopped state, and
   wherein the mediation unit is configured to reflect the torque component acquired through calculation in the second calculation situation in the torque command value when the vehicle has a second vehicle speed including a traveling state.

5. The steering control device according to claim 4, wherein the mediation unit is configured to compensate for the torque component such that sudden change of the torque component between before and after switching is curbed when a component to be reflected in the torque command value is switched between the torque component acquired through calculation in the first calculation situation and the torque component acquired through calculation in the second calculation situation.

* * * * *